US010501062B2

(12) United States Patent
Wulf

(10) Patent No.: US 10,501,062 B2
(45) Date of Patent: Dec. 10, 2019

(54) ELECTRONICALLY CONTROLLABLE PNEUMATIC BRAKE SYSTEM IN A UTILITY VEHICLE AND METHOD FOR ELECTRONICALLY CONTROLLING A PNEUMATIC BRAKE SYSTEM IN A UTILITY VEHICLE

(71) Applicant: WABCO Europe BVBA, Brussels (BE)

(72) Inventor: Oliver Wulf, Neustadt (DE)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 16/319,833

(22) PCT Filed: Jul. 10, 2017

(86) PCT No.: PCT/EP2017/000813
§ 371 (c)(1),
(2) Date: Jan. 23, 2019

(87) PCT Pub. No.: WO2018/041383
PCT Pub. Date: Mar. 8, 2018

(65) Prior Publication Data
US 2019/0248349 A1    Aug. 15, 2019

(30) Foreign Application Priority Data
Aug. 31, 2016 (DE) .................. 10 2016 010 460

(51) Int. Cl.
*B60W 10/184* (2012.01)
*B60T 13/68* (2006.01)
(Continued)

(52) U.S. Cl.
CPC .............. *B60T 13/683* (2013.01); *B60T 8/17* (2013.01); *B60T 8/94* (2013.01); *B60T 13/268* (2013.01);
(Continued)

(58) Field of Classification Search
None
See application file for complete search history.

(56) References Cited

U.S. PATENT DOCUMENTS 4,550,953 A * 11/1985 Bartholomew ....... B60T 13/683
303/15
4,697,852 A   10/1987 Scholz
(Continued)

FOREIGN PATENT DOCUMENTS

DE    3506418 C1    6/1986
DE    10146770 A1   4/2003
(Continued)

*Primary Examiner* — Justin Holmes
(74) *Attorney, Agent, or Firm* — Leydig, Voit & Mayer, Ltd.

(57) ABSTRACT

An electronically controllable pneumatic brake system in a vehicle includes wheel brakes for braking respective wheels of the vehicle. Wheel brakes of at least one vehicle axle include spring-loaded cylinders for implementing a pneumatic parking brake in a parking brake braking circuit of the vehicle. The brake system further includes an electronically controllable monostable bypass valve, wherein the monostable bypass valve is disposed between a manually operated parking brake valve and the spring-loaded cylinders. The monostable bypass valve controls, in a first switching position, a bypass control pressure based on an actuation pressure produced by the parking brake valve to implement a manually specified parking brake force. The monostable bypass valve further controls, in a second switching position, a bypass control pressure depending on a venting pressure prevailing in a bypass vent connection to implement an electrically specified parking brake force.

20 Claims, 6 Drawing Sheets

(51) Int. Cl.
 *B60T 13/38* (2006.01)
 *B60T 13/26* (2006.01)
 *B60T 8/94* (2006.01)
 *B60T 8/17* (2006.01)
 *B60W 10/188* (2012.01)
 *B60T 7/12* (2006.01)

(52) U.S. Cl.
 CPC ......... *B60T 13/385* (2013.01); *B60W 10/184* (2013.01); *B60W 10/188* (2013.01); *B60T 7/12* (2013.01); *B60T 2270/10* (2013.01); *B60T 2270/402* (2013.01); *B60T 2270/403* (2013.01)

(56) References Cited

U.S. PATENT DOCUMENTS

| | | | |
|---|---|---|---|
| 4,900,098 A * | 2/1990 | Kuhn | ................ B60T 13/38 |
| | | | 303/1 |
| 2005/0029864 A1 | 2/2005 | Bauer et al. | |
| 2010/0026084 A1 | 2/2010 | Risse et al. | |
| 2010/0252378 A1 * | 10/2010 | Hilberer | ................ B60T 7/107 |
| | | | 188/106 F |
| 2012/0001477 A1 | 1/2012 | Mederer | |
| 2013/0214588 A1 * | 8/2013 | Kiel | ................ B60T 13/683 |
| | | | 303/6.01 |

FOREIGN PATENT DOCUMENTS

| | | |
|---|---|---|
| DE | 102007014423 A1 | 9/2008 |
| DE | 102008015249 A1 | 9/2008 |
| EP | 2190706 B1 | 6/2011 |
| EP | 2066536 B1 | 11/2011 |
| EP | 2055541 B1 | 3/2013 |
| EP | 2998177 A1 | 3/2016 |

* cited by examiner

ELECTRONICALLY CONTROLLABLE PNEUMATIC BRAKE SYSTEM IN A UTILITY VEHICLE AND METHOD FOR ELECTRONICALLY CONTROLLING A PNEUMATIC BRAKE SYSTEM IN A UTILITY VEHICLE

CROSS REFERENCE TO RELATED APPLICATIONS

This application is a U.S. National Stage Application under 35 U.S.C. § 371 of International Application No. PCT/EP2017/000813 filed on Jul. 10, 2017, and claims benefit to German Patent Application No. DE 10 2016 010 460.0 filed on Aug. 31, 2016. The International Application was published in German on Mar. 8, 2018, as WO 2018/041383 A1 under PCT Article 21(2).

FIELD

The invention concerns an electronically controllable pneumatic brake system in a utility vehicle and a method for the electronic control of a pneumatic brake system.

BACKGROUND

In vehicles, in particular utility vehicles, with a pneumatic brake system, axle modulators can be electronically actuated by a control device (ECU) for controlling brake pressures. The electronic actuation is carried out in this case either depending on a driver's demand specified by a foot brake valve or else depending on an automatically specified set-point vehicle deceleration. The axle modulators then pneumatically produce a corresponding brake pressure that is controlled at brake cylinders of the service brakes of the brake system.

Alternatively, the axle modulators can also be pneumatically actuated by the foot brake valve specifying a control pressure at the axle modulators corresponding to the driver's demand, depending on which the respective axle modulator produces the corresponding brake pressure for the service brakes. ABS functionality is integrated in both versions, so that locking of the wheels during braking can be prevented.

In addition, a pneumatic parking brake with a parking brake valve, which implements a parking brake force that is manually specified by the driver by actuating the parking brake valve, can be provided in a further parking brake braking circuit. In this case, the parking brake valve actuates a spring-loaded brake pneumatically depending on the specified parking brake force by means of a control valve, wherein the spring-loaded brake then holds the vehicle at a standstill. The parking brake can also be implemented as an electropneumatic parking brake, so that the parking brake force can also be specified automatically. By corresponding electrical actuation of the parking brake valve, the parking brake can then also be used as an auxiliary brake, in particular during operation of the utility vehicle, in order to bring about at least supportive braking. For example, a hill-holder function, a starting aid or an automatic parking brake can be implemented by this means.

It is a disadvantage of previous implementations of an automatically actuatable electropneumatic parking brake that many additional components are necessary for retrofitting a pneumatic parking brake that is already present in the vehicle with an electropneumatic parking brake, wherein said components are intended to enable electronic actuation of the parking brake. As a result, the costs and the fitting complexity during a retrofit are very high. But the costs of initial equipment are also increased because of the many components.

In EP 2 066 536 B1 it is proposed to provide a bypass valve implemented as a bistable surge valve in a trailer with an electronic brake system and a parking brake valve for manual actuation of the brake system by means of a spring-loaded brake. The bypass valve is changed over when the vehicle is switched off such that spring-loaded cylinders of the spring-loaded brake are vented and as a result movement of the trailer is prevented. This is intended to achieve that the trailer cannot be removed without authorization when parked. In order to also maintain the switching position of the bypass valve in the de-energized state, the bypass valve is implemented as a bistable surge valve, i.e. for a change-over the bypass valve is stimulated with a short current pulse; the switching position that is set as a result is also maintained in the de-energized state. It is a disadvantage in this case that the bistable surge valve is very cost-intensive.

In EP 2 190 706 B1 a valve arrangement for controlling a brake system of a trailer vehicle is described. According thereto, it is provided to adjust the parking brake braking pressure in a spring-loaded brake by means of a pneumatically controlled 3/2-way valve. If the vehicle is in operation, the 3/2-way valve is pneumatically changed over so that a reservoir pressure medium from a pressure medium reservoir of the trailer is introduced into the spring-loaded brake, i.e. a higher parking brake braking pressure that holds the spring-loaded brake in the released position is adjusted in the spring-loaded cylinders. If a parking function is activated by the driver, the 3/2-way valve is changed over such that a service brake braking pressure adjusted by the service brake function is set as the parking brake braking pressure in the spring-loaded brake. If the driver does not actuate the service brake when at a standstill, the spring-loaded brake is thus automatically applied. In the event of actuation of the service brake, the service brake braking pressure and thus also the parking brake braking pressure in the spring-loaded brake increase, so that the spring-loaded brake is released again. At the same time however, the rising service brake braking pressure is fed to the service brake cylinders, so that said cylinders are applied, and the vehicle is thereby held at a standstill. It is a disadvantage of this solution that very many additional components are necessary in order to retrofit an existing pneumatic parking brake, for example the actuation of the 3/2-way valve is carried out pneumatically, which additionally increases the costs of retrofitting. In addition, graduated manual specification of a parking brake force when the vehicle is in operation is not possible if the parking function is not set.

DE 35 06 418 C1 describes carrying out fully automatic actuation of the holding brake or the spring-loaded brake in a trailer in a spring-loaded holding brake and service brake device for the trailer if the spring-loaded brake in the towing vehicle is also activated. In addition, when the trailer is decoupled the spring-loaded brake is applied automatically. This is carried out by means of electrical actuation of a trailer brake valve that vents the spring-loaded cylinder of the spring-loaded brake once the control input of the trailer brake valve is de-energized. This is the case if the trailer is decoupled or a corresponding electrical signal for braking is specified by the driver, which is transmitted electrically both to a valve of the spring-loaded brake of the towing vehicle and to the trailer brake valve of the trailer. Braking by means of the two spring-loaded brakes is carried out depending on the degree of actuation of the spring-loaded brake, so that smooth actuation is enabled. Purely pneumatic actuation of the trailer control valve is not provided.

EP 2 055 541 B1 describes a driver assistance system with a bistable bypass valve and a monostable bypass valve. By means of the bistable bypass valve, a spring mechanism of a holding brake can be ventilated or vented by either the pressure medium reservoir for releasing the spring mechanism or a vent for applying the spring mechanism being connected to a pneumatic control input of an axle modulator with the bistable bypass valve in a corresponding a switching position. The monostable bypass valve is disposed between the bistable bypass valve and the axle modulator, wherein in one switching position the control pressure that is output by the bistable bypass valve is passed to the axle modulator and otherwise a flow connection is prevented. I.e., in the second switching position of the monostable bypass valve, the prevailing control pressure is held at the axle modulator.

SUMMARY

In an embodiment, the present invention provides an electronically controllable pneumatic brake system in a vehicle. The brake system includes wheel brakes for braking respective wheels of the vehicle. Wheel brakes of at least one vehicle axle include spring-loaded cylinders for implementing a pneumatic parking brake in a parking brake braking circuit of the vehicle. The brake system further includes an electronically controllable monostable bypass valve, wherein the monostable bypass valve is disposed between a manually operated parking brake valve and the spring-loaded cylinders. The monostable bypass valve controls, in a first switching position, a bypass control pressure based on an actuation pressure produced by the parking brake valve to implement a manually specified parking brake force. A maximum actuation pressure corresponds to a reservoir pressure of a reservoir pressure medium in a parking brake pressure medium reservoir supplying the parking brake braking circuit. The monostable bypass valve further controls, in a second switching position, a bypass control pressure depending on a venting pressure prevailing in a bypass vent connection to implement an electrically specified parking brake force. A parking brake braking pressure controlled at the spring-loaded cylinder can be set depending on the respective bypass control pressure. The monostable bypass valve automatically changes over to the first switching position without electrical actuation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
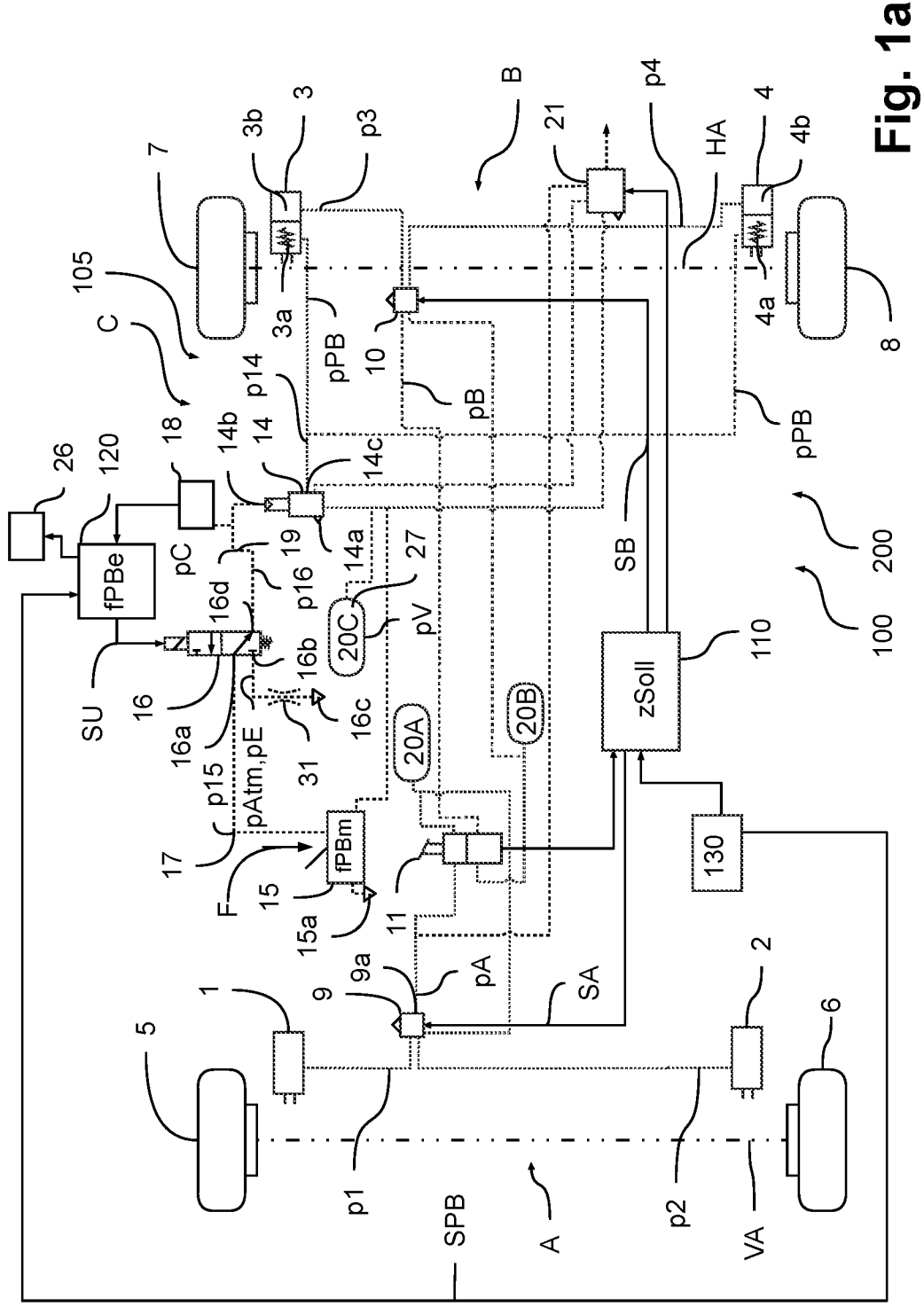
FIGS. 1a, 1b show an electropneumatic brake system according to an embodiment of the invention with a bypass valve in two different embodiments as a block diagram.

Embodiments of the invention provide electronically controllable pneumatic brake systems for utility vehicles, with which a safe and reliable electronic actuation of a pneumatic parking brake can be guaranteed at low cost. Furthermore, embodiments of the invention specify methods for electronically controlling such a brake system in a utility vehicle.

According to embodiments of the invention, for electronically actuating a pneumatic parking brake in a vehicle, in particular a utility vehicle, only one monostable bypass valve with two switching positions, for example a 3/2-way valve, and a parking brake control device are necessary, which in combination provide that the spring-loaded brakes with spring-loaded cylinders, which are part of the pneumatic parking brake, are either actuated by means of a parking brake valve depending on a parking brake force manually specified by the driver or else depending on a parking brake force electrically specified by the parking brake control device by means of a parking brake signal.

According to embodiments of the invention, the bypass valve is monostable, i.e. only a first switching position of the bypass valves is stable, wherein in the first switching position the spring-loaded brakes or the spring-loaded cylinders are actuated depending on the manually specified parking brake force. In this case, stable is understood to mean that without electrical actuation of the monostable bypass valves, i.e. in the de-energized case, the stable first switching position is set automatically.

Within the scope of the invention, in this case if the parking brake valve is fully actuated the vehicle is held at a standstill, i.e. the spring-loaded cylinders of the spring-loaded brakes are fully applied. With a completely unactuated parking brake valve the vehicle is not braked, i.e. the spring-loaded cylinders of the spring-loaded brakes are fully released. Between the fully actuated and the fully unactuated positions, any intermediate positions can be set manually by the driver and thus a variable parking brake force can be specified.

In the first switching position of a monostable bypass valve according to the invention, which constitutes the stable switching position, an actuating pressure specified by the parking brake valve, which is produced depending on manual actuation by the driver, is passed as the parking brake control pressure preferably to a pneumatic control input of a parking brake relay valve. The parking brake relay valve boosts said parking brake control pressure and thereupon outputs an air volume-boosted relay valve pressure, which is passed as the parking brake braking pressure to the spring-loaded cylinders of the spring-loaded brake. If the parking brake braking pressure is lower than an opening pressure of the spring-loaded brake, the spring-loaded brakes change over to the applied or closed position, so that braking is implemented or the vehicle is held at a standstill. If the parking brake braking pressure is higher than the opening pressure, the spring-loaded brake is released. In this way, in said first switching position of the monostable bypass valve the parking brake force specified by the driver is implemented by the spring-loaded brake.

In this case, a monostable bypass valve can be disposed either between the parking brake valve and the parking brake relay valve and thereby can provide that the actuating pressure is passed to the pneumatic control input of the parking brake relay valve as the parking brake control pressure, or else between the parking brake relay valve and the spring-loaded cylinders, so that the monostable bypass valve provides that the air volume-boosted relay valve pressure is output to the spring-loaded cylinders as the parking brake braking pressure.

In principle, the parking brake relay valve that is connected in an intermediate position, which is only used for boosting the air volume, can also be omitted. I.e. in the first switching position of the monostable bypass valve, the actuating pressure is passed directly to the spring-loaded cylinder of the spring-loaded brake as the parking brake braking pressure.

In the unstable second switching position of the monostable bypass valve, which is only set if a bypass signal is applied to the monostable bypass valve, i.e. the monostable bypass valve is energized, only a low parking brake braking pressure is controlled at the spring-loaded cylinders. The spring-loaded brakes thus change over to the fully closed position. I.e. in the second switching position of the monostable bypass valve, maximum braking is brought about by the spring-loaded brake.

If the monostable bypass valve is disposed between the parking brake valve and the parking brake relay, in the second switching position it provides that the pneumatic control input of the parking brake relay valve is connected to a bypass vent connection, so that the pneumatic control input is vented. However, if the monostable bypass valve is disposed between the parking brake relay valve and the spring-loaded cylinders, then in the second switching position said cylinders are connected to the bypass vent connection. In both cases, in the second switching position a minimum parking brake braking pressure is produced that provides for application of the spring-loaded cylinders.

The second switching position is set if a parking brake force is automatically demanded by the parking brake control device with the vehicle in operation, for example in the context of a comfort function, for example a hill-holder function or a hill-starting aid, or by an assistance control device for automatic braking of the vehicle, for example an automatic parking brake function or even an auxiliary parking brake function. Furthermore, an automatic demand for a parking brake force can also be provided by setting the second switching position if there is a failure in the electrical actuation of the service brakes of the vehicle, in particular an automatically controlled vehicle, i.e. in a redundancy situation.

Thus, it is advantageously recognized that graduated braking is not absolutely necessary during electronic actuation of the pneumatic parking brake. Rather, for example for holding the vehicle at a standstill in one of the comfort functions or during auxiliary braking or in a redundancy situation, in the event of a failure of the automatic electrical actuation full application of the spring-loaded brake is sufficient. Therefore, in a very simple embodiment the electrical specification of a graduated parking brake force can be omitted, and costs can be saved as a result.

Advantageously, the manual actuation of the parking brake can be retained without using additional components for this, such as a select-high valve or pneumatic latching, for example.

If as a result of one of the comfort functions the driver forgets to manually activate the parking brake when switching off or parking the vehicle for a long period or if long-term switch-off of the vehicle is necessary for safety reasons in a redundancy situation or in an emergency situation, the monostable bypass valve is initially energized for the long term so that the spring-loaded cylinders remain applied for the long term. If sufficient energization of the monostable bypass valve and thus a safe long-term switch-off of the vehicle can no longer be ensured, advantageously a venting function intervenes. The long-term switch-off of the vehicle is understood in this case to mean that the driver does not intend to move the vehicle and also for example switches the ignition off and may also leave the vehicle.

The venting function brings about that the vehicle can be held at a standstill by means of the spring-loaded brake when switching off or parking the vehicle for the long term, either intentionally or when constrained to do so, even without a manual command to apply the spring-loaded brake by means of the parking brake valve and while the monostable bypass valve is in the de-energized and stable first switching position. The venting function is implemented such that on detecting a desired or constrained long-term switch-off or parking of the vehicle and a simultaneously unactuated parking brake valve, delivery of a reservoir pressure medium into a parking brake braking circuit assigned to the pneumatic parking brake is inhibited or limited. According to a particular design this is implemented as follows:

Accordingly, filling a parking brake pressure medium reservoir with the reservoir pressure medium for the parking brake braking circuit, in which the pneumatic parking brake is operated, by means of a pressure medium reservoir filling device is prevented if the driver has not manually actuated the parking brake when switching the vehicle off for the long term—intentionally or when constrained to do so. Switching off the vehicle for the long term intentionally or when constrained to do so—is detected in this case from the fact that a switch-off signal is output by an engine control device for example, wherein the signal indicates whether the ignition has been actuated or whether the engine is running. Alternatively, a forced switch-off of the vehicle by the parking brake control device—for example in a redundancy situation or in an emergency situation—can even be brought about by stalling the engine by means of an immobilizer. At the same time, it can be detected by means of a pressure switch whether a parking brake control pressure is specified by manual driver actuation and the driver is actuating the parking brake valve.

If there is no driver actuation of the parking brake and the vehicle is switched off or the engine is not running, in the context of the venting function the monostable bypass valve is brought into the first switching position if the first switching position is not already set—and as a result reservoir pressure medium is taken from the parking brake pressure medium reservoir in order to build up an actuating pressure or a parking brake control pressure corresponding to the actuation of the parking brake valve and a corresponding parking brake braking pressure. A reservoir pressure prevailing in the parking brake pressure medium is reduced as a result, at the same time refilling of reservoir pressure medium into the parking brake pressure medium reservoir is prevented as energy is no longer being supplied to the pressure medium reservoir filling device by the switched-off engine and thus no new reservoir pressure medium can be pumped into the parking brake pressure medium reservoir.

Before the parking brake braking pressure exceeds the opening pressure, the monostable bypass valve is brought into the second switching position in the context of the venting function. As a result, release of the spring-loaded brake is prevented if this has already been pulled in. Otherwise, the spring-loaded brakes are applied. By setting the second switching position and venting, the parking brake control pressure and the parking brake braking pressure reduce because pressure medium is discharged from the parking brake braking circuit. Owing to said discharging, the pressure medium is no longer available for a subsequent actuation.

The parking brake pressure medium reservoir can also be emptied by a single or multiple switchover of the monostable bypass valve. Said switchover is carried out until a reservoir pressure prevailing in the parking brake pressure medium reservoir is less than the opening pressure of the spring-loaded cylinder. The feed of reservoir pressure medium from the parking brake pressure medium reservoir is thus limited, i.e. from this point in time the spring-loaded brake can no longer be acted upon so strongly as to change over into the opened position. The vehicle is thus held at a standstill regardless of the actuation of the parking brake valve and without electrical actuation of the monostable bypass valve.

Only if the driver actuates the ignition again and the engine starts is the parking brake pressure medium reservoir refilled by means of the pressure medium reservoir filling device and the vehicle can be moved. Thus, it is advantageously achieved that even with the parking brake valve unactuated, not enough pressure medium is present in the parking brake braking circuit in order to build up a parking brake braking pressure greater than the opening pressure and therefore such that the spring-loaded brake is changed into the released position by means of the spring-loaded cylinders. Said prevention or limiting of the pressure medium feed advantageously requires only software control adapted to the parking brake control device, for example, and only components already present in the vehicle, whereby the overall costs can be kept low.

Thus, it is advantageously ensured with little effort that the vehicle can be kept at a standstill if the driver forgets to manually actuate the parking brake valve during switch-off or parking of the vehicle, for example. It is advantageously detected in this case that it is only required for the venting function that the vehicle is safely held in a braked state. Accordingly, components that are not absolutely necessary for holding the vehicle at a standstill can be omitted. Thus, advantageously no cost-intensive valves—for example bistable valves—are necessary that keep the monostable bypass valve in a second switching position, in which the spring-loaded brake is automatically applied by venting the spring-loaded cylinder, when switching off or parking the vehicle.

According to an advantageous development, with the design according to the invention simplified graduated control of the parking brake braking pressure can also be carried out electrically by means of the parking brake control device. For this the monostable bypass valve can be actuated in a pulsed manner for example, i.e. energization and de-energization takes place alternately by means of the bypass signal. As a result, the parking brake control pressure is changed over alternately between the actuating pressure and the venting pressure. Depending on selected times for the energization and de-energization in said changeover process, a parking brake control pressure or a parking brake braking pressure is specified by the monostable bypass valve that corresponds to a mixture of the actuating pressure or the relay valve pressure and the venting pressure. Thus, by a corresponding adjustment of the times a graduated parking brake braking pressure can be specified that brings the spring-loaded brake into an actuation position between a fully applied actuation position and an actuation position corresponding to the driver's demand. When applying the parking brake while travelling, a cadence braking function can thus also be implemented with suitable selection of the energized and non-energized phases, by means of which permanent locking of the wheels can be avoided.

The cadence braking function can advantageously be achieved by ensuring that wheels that are tending to lock can be started again during alternating switchover. This is for example the case if the parking brake braking pressure or the parking brake control pressure repeatedly increases above a pressure limit of for example 6.5 bar at least for a time limit of for example 0.25 s. In this case it is ensured that a wheel that is tending to lock can rotate again.

According to an advantageous development, an additional safety valve is provided to implement a safety function. The safety valve is provided between the bypass vent connection and the monostable bypass valve. The switchover of the safety valve is always carried out at the same time as the switchover of the monostable bypass valve. I.e. only if both valves are changed over is the venting pressure passed as the parking brake control pressure to the pneumatic control input of the parking brake control valve or to the spring-loaded cylinders. By this means it can be provided that the vehicle is actually only braked or held at a standstill by means of the spring-loaded cylinders if the safety valve is also changed over when a switchover of the monostable bypass valve into the second switching position is carried out.

As a result, it can advantageously be ensured that the spring-loaded brake is not applied in the event of a faulty and thus unintended actuation of the monostable bypass valve. Only if the safety valve also changes over at the same time can the spring-loaded brake be applied by means of the correspondingly low parking brake control pressure or low parking brake braking pressure.

In the event of a failure of the parking brake control device or the actuation of the monostable bypass valve, it can be required for the driver to apply the parking brake manually or to carry out another safety measure in order to keep the vehicle safely at a standstill. In addition, braking by means of the further wheel brakes or service brakes in the vehicle can also be demanded by the parking brake control device. Alternatively, the service brake control device can also take over the function of the parking brake control device if the parking brake control device and/or the actuation of the monostable bypass valve has failed.

As a result, operation of the parking brake can be made safer. In order to obviate failures in the power supply, an additional energy source can be provided for the parking brake control device, so that even in the event of a failure of the other brake circuits in the vehicle it can still be braked at least alternatively by means of the parking brake braking circuit. The additional power supply can in particular be a generator, for example an alternator, and/or a short-term storage device and/or a high voltage storage device and/or a second energy source, each of which operates independently of a first energy source that provides an electrical supply for the brake system during normal operation.

Figure 1B:
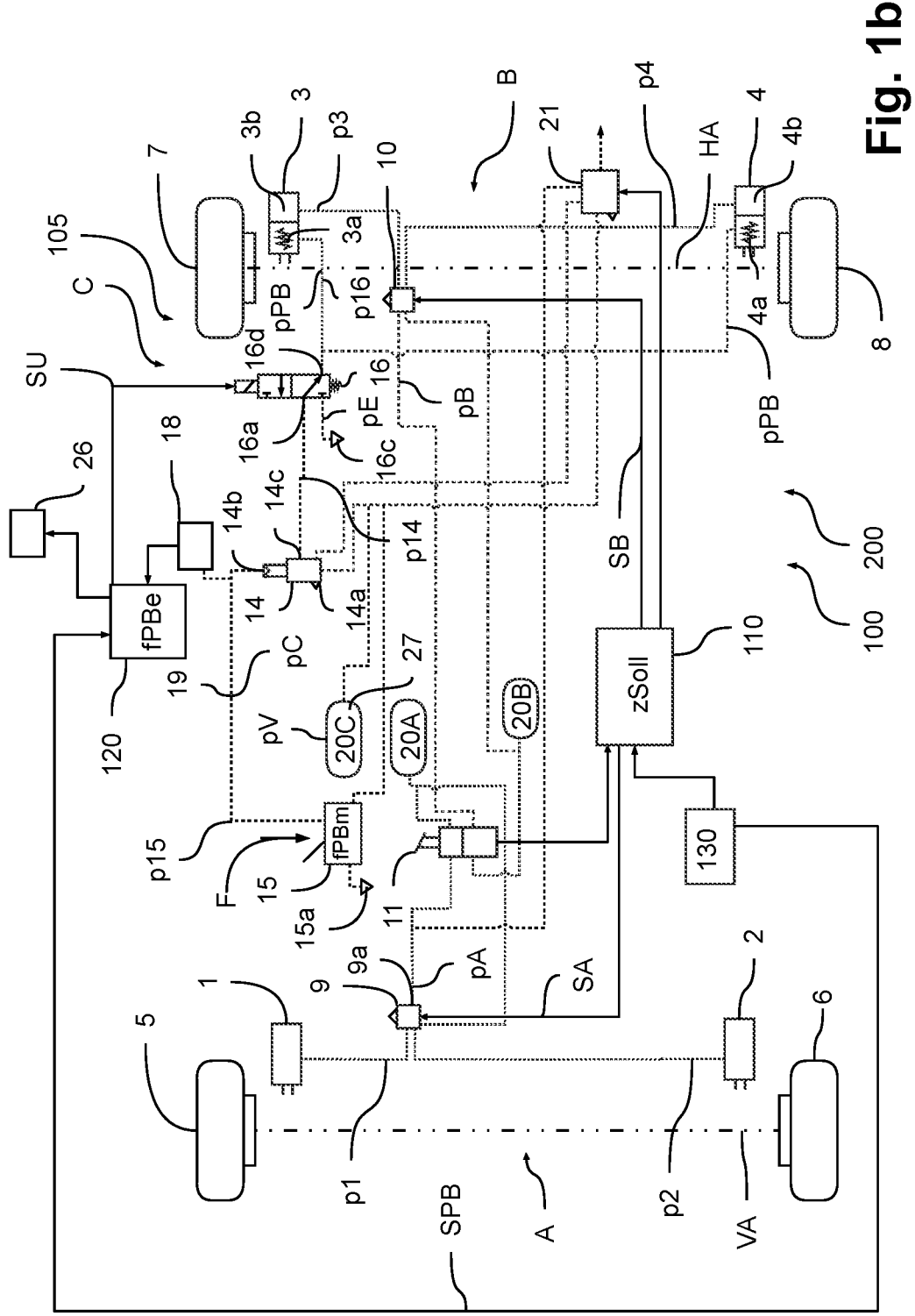

In the embodiments according to FIGS. 1*a* and 1*b*, a section of an electropneumatic brake system 100 of a vehicle 200, in particular a utility vehicle, is represented as a block diagram, wherein the electropneumatic brake system is implemented as an EBS brake system 100, i.e. a braking command is carried out electrically during normal operation. The EBS brake system 100 comprises four wheel brakes 1, 2, 3, 4 for this, which are used to brake the wheels 5, 6, 7, 8 of the vehicle 200. Three brake circuits A, B, C are provided for braking, to each of which a pressure medium reservoir 20A, 20B, 20C is assigned in order to supply the respective brake circuits A, B, C with a reservoir pressure medium 27 and thus to enable the build-up of a brake pressure p1, p2, p3, p4, pPB for the respective wheel brakes 1, 2, 3, 4.

In a first service brake braking circuit A the wheel brakes 1, 2 are disposed on the wheels 5, 6 of a front axle VA, wherein the wheel brakes 1, 2 are implemented as service brakes. The wheel brakes 3, 4 on a rear axle HA are implemented with combined spring-loaded cylinders 3a, 4a and service brake cylinders 3b, 4b, so that the wheels 7, 8 of the rear axle HA can be braked on the one hand by means of a second service brake braking circuit B with a service brake function and also additionally by means of a parking brake braking circuit C with a parking brake function. The wheel brakes 3, 4 on the rear axle HA thus comprise both spring-loaded cylinders 3a, 4a and service brake cylinders 3b, 4b, which are supplied mutually independently with a parking brake braking pressure pPB or a service brake braking pressure p3, p4. Thus, a pneumatic parking brake 105 can be implemented in the vehicle 200 by the parking brake braking circuit C.

In both service brake braking circuits A, B, the service brake braking pressures p1, p2, p3, p4 are produced during normal operation by means of electrically controlled axle modulators 9, 10 by control signals SA, SB being electrically transmitted by a service brake control device 110 (ECU) to the axle modulators 9, 10, which then control the reservoir pressure medium 27 from the corresponding pressure medium reservoir 20A, 20B with a defined service brake braking pressure p1, p2, p3, p4. The level of the service brake braking pressures p1, p2, p3, p4 results in particular from a demanded setpoint vehicle deceleration zSoll, which according to said exemplary embodiment results from a demand manually specified by the driver by means of a foot brake valve 11 or from an assistance control device 130 (ADAS-ECU, (A)dvanced-(D)river-(AS)sistance), which is provided for automatic control of the vehicle 200.

A response to a case of ABS braking slip on the wheels 5, 6, 7, 8 of both vehicle axles VA, HA can be made by corresponding electrical actuation of the respective axle modulator 9, 10.

In the event of a failure or a defect of the electronic actuation of the two axle modulators 9, 10, a change can be made to a pneumatic fallback level by controlling a pneumatic service brake control pressure pA, pB at the respective axle modulator 9, 10 in the event of actuation of the foot brake valve 11 by the driver. The respective axle modulator 9, 10 then boosts the service brake control pressure pA, pB accordingly and outputs the same as the service brake braking pressure p1, p2, p3, p4 to the corresponding service brake braking circuit A, B. Thus, a change can be carried out from electronic actuation of the axle modulators 9, 10 to pneumatic actuation in a redundancy situation.

In the parking brake braking circuit C, a parking brake relay valve 14 with a pneumatic control input 14b is provided. The parking brake relay valve 14 is actuated pneumatically by means of a parking brake control pressure pC, which the parking brake relay valve 14 outputs to the spring-loaded cylinders 3a, 4a of the wheel brakes 3, 4 of the rear axle HA in the usual way with a boosted air volume and consequently an air volume boosted relay valve pressure p14 as the parking brake braking pressure pPB. The spring-loaded cylinders 3a, 4a operate in this case so as to change over to a closed or applied actuation position in the event of a parking brake braking pressure pPB that is lower than an opening pressure p0 of for example 6.1 bar and change over to an open or released actuation position in the event of a parking brake braking pressure pPB that is higher than the opening pressure p0.

The parking brake control pressure pC can be produced depending on the manual actuation of a parking brake valve 15 by the driver that specifies a manual parking brake force fPBm, or else depending on an electrical parking brake demand in the form of a parking brake signal SPB from a parking brake control device 120 that specifies an electrical parking brake force fPBe. The parking brake signal SPB is electrically passed to the parking brake control device 120 from the assistance control device 130, which can automatically request actuation of the pneumatic parking brake 105 with the electrical parking brake force fPBe by means of the parking brake control device 120. Alternatively, in a redundancy situation, i.e. if for example the assistance control device 130 or the service brake control device 110 has failed or is defective, an electrical parking brake force fPBe can also be specified by the parking brake control device 120 in order to respond to the redundancy situation.

As a result, on the one hand a manual parking brake function can be implemented if the driver of the vehicle 200 wants to park for example and actuates the parking brake valve 15 for this purpose, or else a holding function is activated in a bus and as a result a manual parking brake force fPBm is specified. In the event of automatic activation by means of the parking brake control device 120 on the other hand, for example auxiliary braking demanded by the assistance control device 130 or automatically demanded parking braking or a comfort function demanded by the parking brake control device 120 can be implemented if certain triggering criteria are satisfied. Furthermore, a response can be made to a redundancy situation. Accordingly, automatic activation by specifying an electrical parking brake force fPBe for example can be carried out if the vehicle 200 is at a standstill in operation for a period of 5 s, for example, or a hill-holder or hill-starting aid is active or the assistance control device 130 or the service brake control device 110 has failed or is defective.

Whether manual or automatic activation of the pneumatic parking brakes 105 is carried out can be determined by means of a switching position Z1, Z2 of an electrically controllable monostable bypass valve 16, wherein the monostable bypass valve 16 is implemented as a 3/2-way valve. A first input port 16a of the monostable bypass valve 16 is connected by means of a connecting line 17 to the parking brake valve 15 and a second input port 16b is connected to a bypass vent connection 16c. An output port 16d of the monostable bypass valve 16 is connected by means of a control line 19 to the pneumatic control input 14b of the parking brake relay valve 14, by means of which a bypass control pressure p16, which in this exemplary embodiment specifies the parking brake control pressure pC, is transmitted.

In the event of manual activation of the pneumatic parking brakes 105 by means of the parking brake valve 15 and in a first switching position Z1 of the monostable bypass valve 16, an actuating pressure p15 is specified by means of the parking brake valve 15—depending on the specification of the manual parking brake force fPBm—that is passed to the parking brake relay valve 14 by means of the monostable bypass valve 16 as the bypass control pressure p16 or the parking brake control pressure pC. The manual parking brake force fPBm and thus the parking brake control pressure pC can preferably be continuously specified in this case by corresponding manual actuation by the driver.

In the first switching position Z1, the monostable bypass valve 16 is not energized. Said first switching position Z1 is thus a stable switching position, to which the monostable bypass valve 16 automatically reverts if there is no specified bypass signal SU, which can be achieved by a spring pretension, for example.

In the event of the maximum manual parking brake force fPBm or full actuation of the parking brake valve 15 and with the first switching position Z1 set, the connecting line 17 is fully vented by means of a second parking brake vent connection 15a, so that a lower actuating pressure p15 (approximately atmospheric pressure pAtm) is applied as the parking brake control pressure pC to the pneumatic control input 14b of the parking brake relay valve 14. In the case of the minimum manual parking brake force fPBm or the non-actuated parking brake valve 15, a higher actuating pressure p15 from the parking brake pressure medium reservoir 20C is specified by means of the parking brake valve 15 as the parking brake control pressure pC. The parking brake braking pressure pPB is produced by the parking brake relay valve 14 at a corresponding level depending on the parking brake control pressure pC and is output to the spring-loaded cylinders 3a, 4a, which close at a low parking brake braking pressure pPB that is lower than the opening pressure p0 and open otherwise.

If automatic activation of the pneumatic parking brake 105 is to be carried out by means of the parking brake control device 120 depending on the electrical parking brake force fPBe, the bypass valve 16 is brought into the second switching position Z2 thereof by the parking brake control device 120 by a bypass signal SU by means of at least temporary energization, wherein the second switching position Z2 is not stable, i.e. said second switching position Z2 is not maintained in the absence of the bypass signal SU and when there is thus no energization.

In said second switching position Z2, the bypass vent connection 16c is connected to the output port 16d of the monostable bypass valve 16, so that a lower venting pressure pE acting in the bypass vent connection 16c, which approximately corresponds to the atmospheric pressure pAtm, is applied to the pneumatic control input 14b as the bypass control pressure p16 or the parking brake control pressure pC. The level of the parking brake control pressure pC thus corresponds in this case to about the level that prevails if a maximum manual parking brake force fPBm is specified by the parking brake valve 15 in the first switching position Z1 of the monostable bypass valve 16, and as a result venting of the connecting line 17 is also carried out—in this case by means of the parking brake vent connection 15a.

Thus, the parking brake control pressure pC can also be specified by means of electrical actuation, and thus electrical actuation of the pneumatic parking brakes 105 can be carried out. In this case, the bypass signal SU can be specified depending on the electrical parking brake force fPBe either continuously or else in a pulsed manner, i.e. the monostable bypass valve 16 is permanently in the second switching position Z2 in the case of automatic actuation or changes back and forth between the first and second switching positions Z1, Z2 with a defined frequency.

In the case of continuous actuation of the monostable bypass valve 16 in the second switching position Z2, only full venting by means of the bypass vent connection 16c is possible, so that the parking brake control pressure pC in said second switching position Z2 is set to a value, namely the venting pressure pE; the spring-loaded cylinders 3a, 4a are also applied permanently, which is particularly relevant for a long-term switch-off the vehicle when parking, in a redundancy situation or for holding the vehicle at a standstill for longer, for example at a stopping point.

In the case of pulsed actuation of the monostable bypass valve 16 on the other hand, graduated actuation of the spring-loaded cylinders 3a, 4a is also possible, for example if no switch-off of the vehicle is desired but graduated auxiliary braking or redundant braking with a defined non-minimal electrical parking brake force fPBe is to be carried out. This is because in this case, depending on the frequency of changeover the parking brake control pressure pC corresponds to a mixture, preferably an average value, of the actuating pressure p15 and the venting pressure pE. In this case the graduation or the ultimately controlled parking brake control pressure pC is determined by the frequency of the bypass signal SU, which is pulsating in that case. This can be used during auxiliary braking or redundant braking while travelling to decelerate the vehicle 200 in a stable way in a safe state, because a cadence braking function SF can be implemented by varying the parking brake control pressure pC and thus also the parking brake braking pressure pPB, by means of which permanent locking of the wheels can be prevented. By means of an additional optional choke 31, the profile of the parking brake control pressure pPB can be smoothed by limiting the volumetric flow towards the bypass vent connection 16c, because a reduction of the pressure to the venting pressure pE is carried out more slowly.

By means of an additional pressure sensor or a simple pressure switch 18, which taps the parking brake control pressure pC, it can additionally be achieved that the parking brake control device 120 can detect whether the driver is himself causing parking braking or not when the first switching position Z1 of the monostable bypass valve 16 is active and thus whether an automatic demand by means of the second switching position Z2 is necessary or not.

In the event of a failure of the parking brake control device 120 or the actuation of the monostable bypass valve 16, it can additionally be provided to request the driver by means of a warning device 26 to operate the parking brake valve 15 manually or to initiate other safety measures in order to safely hold the vehicle 200 at a standstill. In addition, braking by means of the service brakes 1, 2, 3b, 4b in the vehicle 200 can also be commanded by the parking brake control device 120.

Furthermore, a trailer control valve 21 is provided in the vehicle 200, to which are fed the service brake control pressure pA for the first axle modulator 9 of the front axle VA on the one hand and the parking brake braking pressure pPB of the parking brake relay valve 14. By this means, a trailer that is not shown can also be actuated to cause corresponding braking.

According to the embodiment in FIG. 1b, the position of the bypass valve 16 is changed compared to FIG. 1a. Accordingly, the monostable bypass valve 16 is not disposed between the parking brake valve 15 and the pneumatic control input 14b of the parking brake relay valve 14 but between a pneumatic brake pressure output 14c of the parking brake relay valve 14 and the spring-loaded cylinders 3a, 4a. The manner of operation of the monostable bypass valve 16 is essentially identical with the difference that the monostable bypass valve 16 now specifies the parking brake braking pressure pPB and no longer the parking brake control pressure pC. In the first switching position Z1 of the monostable bypass valve 16, in this case the air volume-boosted relay valve pressure p14 that is output by the parking brake relay valve 14 is controlled as the parking brake braking pressure pPB at the spring-loaded cylinders 3*a*, 4*a* and in the second switching position the venting pressure pE is controlled as the parking brake braking pressure pPB, so that the spring-loaded cylinders 3*a*, 4*a* implement the driver's demand in the first switching position Z1 and are applied by venting in the second switching position Z2.

In principle, the parking brake relay valve 14 that is connected in an intermediate position and that is only used for boosting the air volume can also be omitted. I.e. in the first switching position Z1 of the monostable bypass valve 16 the actuating pressure p15 is passed directly to the spring-loaded cylinders 3*a*, 4*a* as the parking brake braking pressure pPB and in the second switching position Z2 the venting pressure pE is passed directly to the spring-loaded cylinders 3*a*, 4*a* as the parking brake braking pressure pPB.

Figure 2:
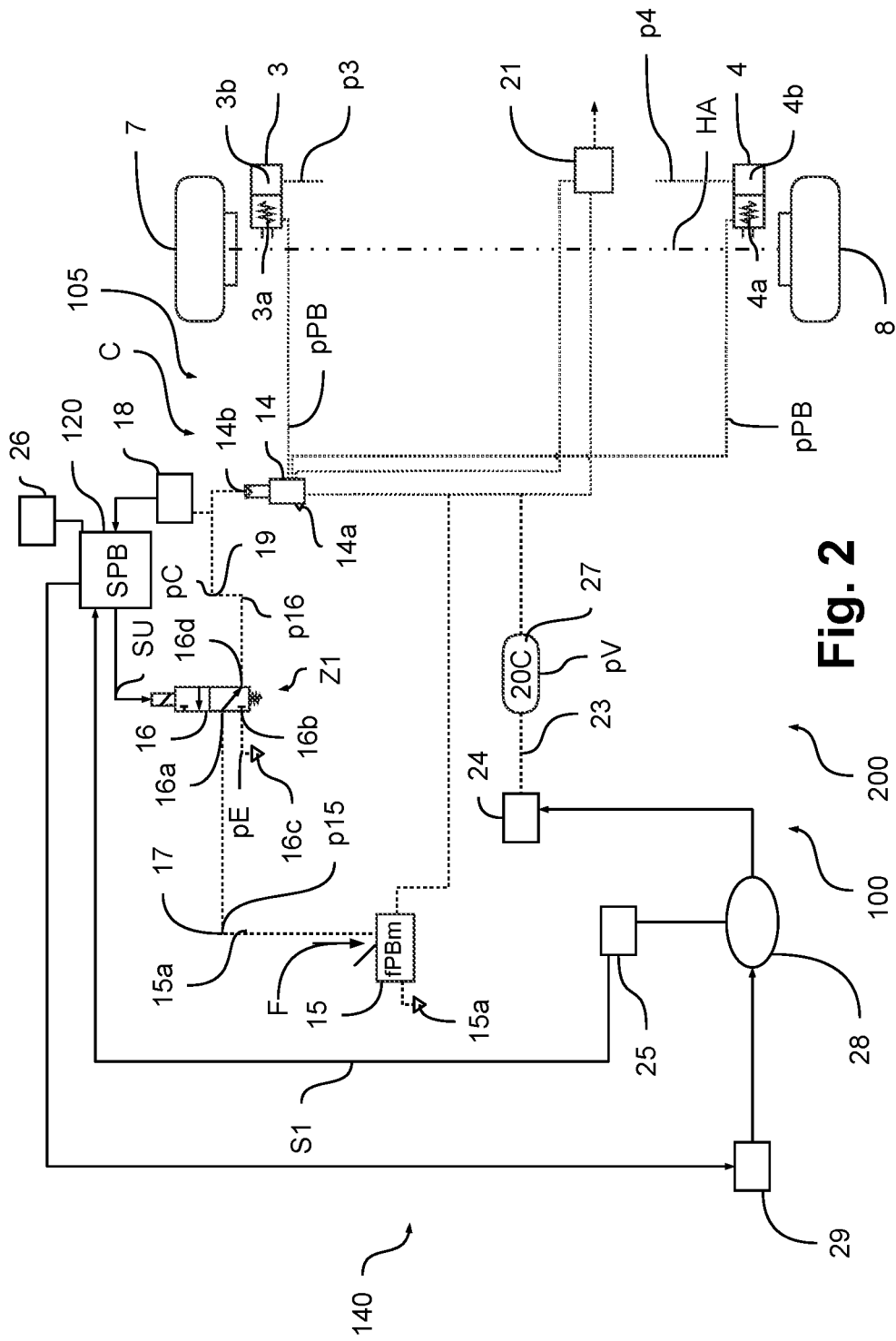
FIG. 2 shows a venting function of a brake system according to an embodiment of the invention.

According to FIG. 2, a special embodiment of a venting function 140 is represented. Said venting function 140 provides that for example following automatic clamping of the spring-loaded cylinders 3*a*, 4*a* by means of the parking brake control device 120, for example in the context of one of the comfort functions or in a redundancy situation, the switched-off or parked vehicle 200 can be safely held at a standstill if the driver does not manually actuate the parking brake valve 15, even without permanent energization of the bypass valve 16 by means of the bypass signal SU to vent the control line 19. As a result, a safe switch-off of the vehicle can be guaranteed even if sufficient energization of the monostable bypass valve 16 is no longer possible. However, said venting function 140 can also be provided without previous automatic activation, for example if it is detected that the driver wishes to switch off or park the vehicle 200, but in this case forgets to manually operate the parking brake valve 15 and thus to manually activate the pneumatic parking brake 105.

A pressure medium reservoir filling device 24 is provided In a filling line 23 of the parking brake pressure medium reservoir 20C for the parking brake braking circuit C, which during normal operation provides that the parking brake pressure medium reservoir 20C is filled with sufficient reservoir pressure medium 27 to provide sufficient reservoir pressure pV in the parking brake pressure medium reservoir 20C of the parking brake braking circuit C, even after a number of venting phases via the parking brake vent connection 15*a*, the bypass vent connection 16*c* or a relay valve vent connection 14*a* on the parking brake relay valve 14.

According to this embodiment, the pressure medium reservoir filling device 24 has a working connection to an engine 28 controlled by an engine control device 25, wherein when the engine 28 is switched on the reservoir pressure medium 27 is pumped into the parking brake pressure medium reservoir 20C by means of a pump that is not shown of the pressure medium reservoir filling device 24 in order to refill said reservoir. When the engine 28 of the vehicle 200 is turned off, the pump of the pressure medium reservoir filling device 24 is switched off and thus a pressure medium feed into the parking brake pressure medium reservoir 20C is stopped until the engine 28 is switched on again. At the same time, the parking brake control device 120 is notified by means of a switch-off signal S1 from the engine control device 25 as to whether the engine 28 is turned off or not. Alternatively, the parking brake control device 120 can also read out an engine 28 shutdown via an ignition terminal.

If the engine 28 is turned off and it is determined by means of the pressure switch 18 that the driver is not operating the parking brake valve 15 in the first switching position Z1 of the monostable bypass valve 16—i.e. the parking brake control pressure pC is low—the parking brake control device 120 provides for a switchover of the bypass valve 16: If the vehicle 200 has been turned off or parked following automatic activation of the parking brake 105 or is automatically brought to a standstill in a redundancy situation, the bypass valve 16 is brought into the first switching position Z1. Because the driver has forgotten to operate the parking brake valve 15 when at a standstill, as a result the reservoir pressure medium 27 is automatically taken from the parking brake pressure medium reservoir 20C and introduced into the connecting line 17 and the control line 19, whereupon the parking brake control pressure pC rises. Once the parking brake control pressure pC has risen so much that a parking brake braking pressure pPB is produced that exceeds a pressure limit pG, the parking brake control device 120 switches the bypass valve 16 back into the second switching position Z2.

In this case, the pressure limit pG lies at 4 bar for example and is thus below the opening pressure p0 of the spring-loaded cylinders 3*a*, 4*a*. As a result, the vehicle 200 that is automatically held at a standstill is prevented from starting to roll by releasing the rear wheel brakes 3, 4.

At the same time it is achieved that some of the reservoir pressure medium 27 is taken from the parking brake pressure medium reservoir 20C and thus the reservoir pressure pV in the parking brake pressure medium reservoir 20C reduces because the parking brake control pressure pC and the parking brake braking pressure pPB in the parking brake braking circuit C are provided from the parking brake pressure medium reservoir 20C. Owing to the subsequent switchover into the second switching position Z2, the pressure medium in the control line 19 at the parking brake control pressure pC is discharged into the bypass vent connection 16*c*, and because of the resulting reduction of the parking brake control pressure pC the pressure medium from the spring-loaded cylinders 3*a*, 4*a* at the parking brake braking pressure pPB is discharged into the parking brake relay valve 14 via the relay valve vent connection 14*a*.

Said process is repeated until the parking brake pressure medium reservoir 20C is emptied by the multiple discharging of the parking brake control pressure pC or the parking brake braking pressure pPB or the reservoir pressure pV has fallen below the opening pressure p0. If this is the case, even if the parking brake valve 15 is not actuated and the bypass valve 16 is not energized, the reservoir pressure pV in the parking brake pressure medium reservoir 20C is no longer sufficient to release the spring-loaded cylinders 3*a*, 4*a*; even if the parking brake valve 15 is not actuated, the vehicle 200 is also held at a standstill until the ignition is actuated again and/or the engine is running again and as a result the parking brake pressure medium reservoir 20C is refilled as controlled by the pressure medium reservoir filling device 24.

The venting function 140 can for example also be activated if the parking brake control device 120 activates an immobilizer 29 that provides that the fuel feed to the engine 28 is stopped and the engine 28 stalls as a result and the pressure medium reservoir filling device 24 is no longer providing reservoir pressure medium 27. This can occur for example if safe braking of the vehicle 200 to a standstill or holding the vehicle 200 at a standstill is absolutely necessary in a redundancy situation for safety reasons. Following the actuation of the immobilizer 29, the monostable bypass valve 16 is automatically actuated according to the above approach in order reduce the reservoir pressure pV to below the opening pressure p0 and as a result to prevent the release of the spring-loaded cylinders 3a, 4a.

Figure 3:
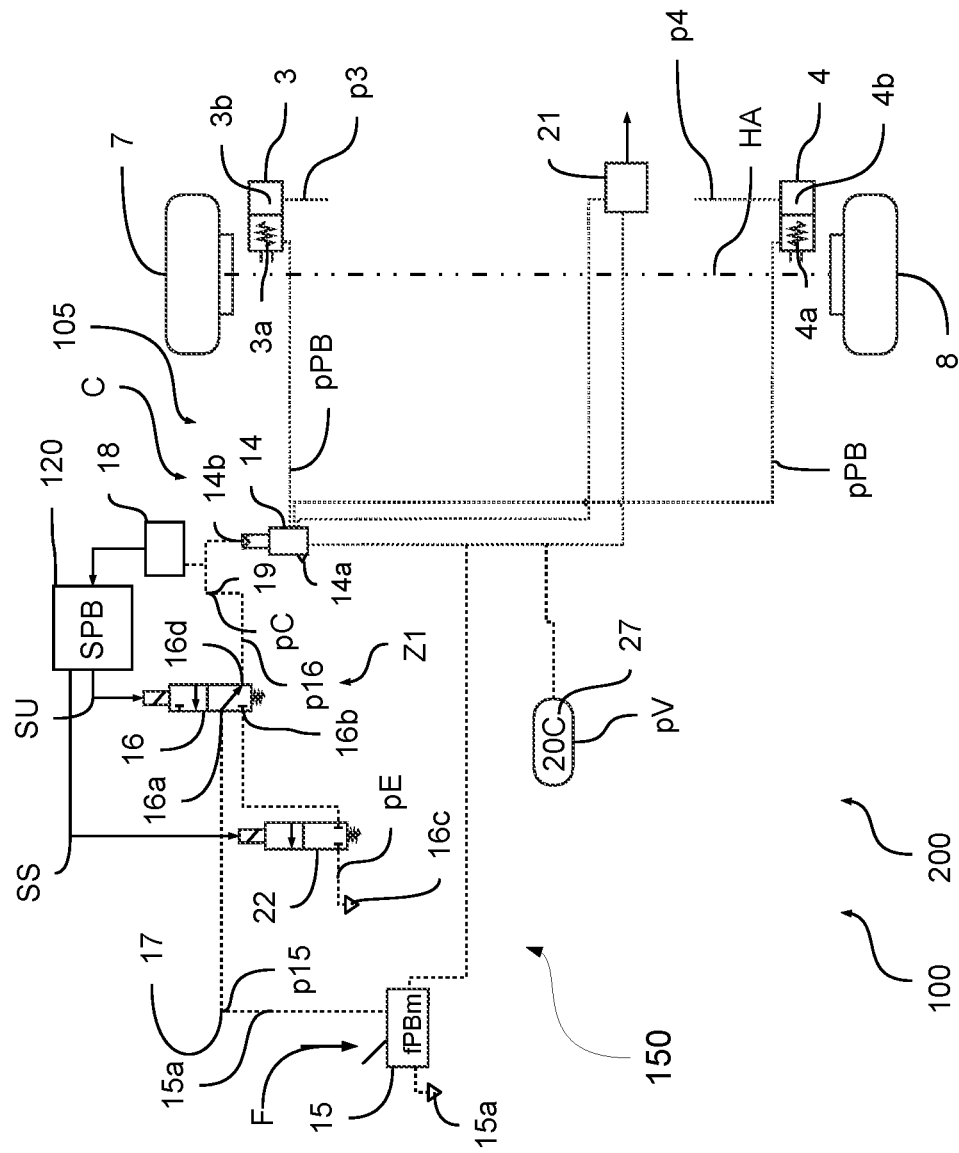
FIG. 3 shows a further embodiment of a brake system according to an embodiment of the invention with a safety function.

According to FIG. 3, a further embodiment of the electropneumatic brake system 100 is shown. Accordingly, an additional safety valve 22 is provided, which can be changed over or energized at the same time as the bypass valve 16 by the parking brake control device 120 by means of a safety signal SS. As a result, it can be prevented that in the event of a faulty and thus inadvertent switchover of the bypass valve 16, venting via the bypass vent connection 16c and thus unintended braking by means of the rear wheel brakes 3, 4 occurs. As a result, a safety function 150 can be implemented, because only if both valves 16, 22 are actually energized at the same time will the control line 19 be vented and a correspondingly low parking brake control pressure pC will be specified for the parking brake relay valve 14 in order to decelerate by means of the rear wheel brakes 3, 4.

Figure 4A:
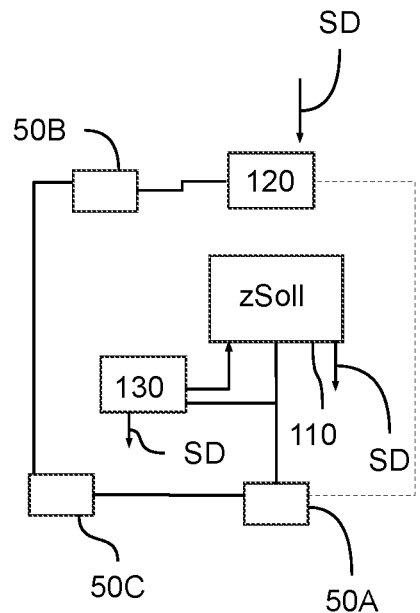
FIGS. 4a-d show versions for supplying power to the electropneumatically controlled brake system according to FIG. 1.

According to FIGS. 4a, b, c, d, different versions of a redundant power supply are shown, which can provide that the parking brake control device 120 can actuate the bypass valve 16 in a redundancy situation.

According to one embodiment, as shown in FIG. 4a a first energy source 50A is provided that supplies both the service brake control device 110, the assistance control device 130 and possibly also the parking brake control device 120 with energy and a second energy source 50B that also or exclusively supplies the parking brake control device 120 with energy. The first energy source 50A and the second energy source 50B are both connected to a generator 50C, for example an alternator, of the utility vehicle 200.

In the event of a failure of the first energy source 50A, during which the brake system 100 can no longer be electrically controlled by means of the service brake control device 110 and the axle modulators 9, 10, electrically redundant actuation by means of the parking brake control device 120 is thus ensured, because the second energy source 50B can compensate for the failure.

Alternatively, only the first energy source 50A that is connected to the generator 50C can be used, which is connected via a fuse to the service brake control device 110 and the assistance control device 130 and via a further fuse to the parking brake control device 120.

Figure 4B:
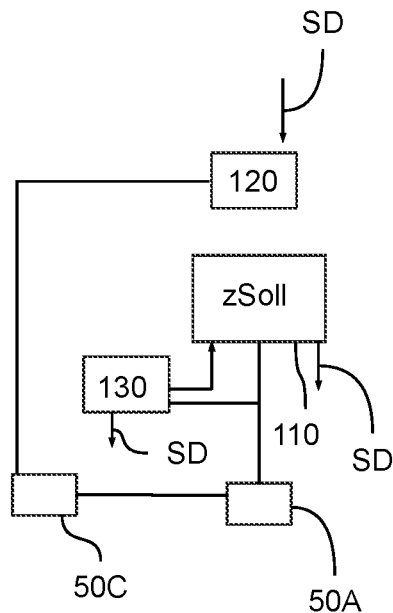

According to an alternative embodiment represented in FIG. 4b, it is provided to directly connect the parking brake control device 120 in a corresponding way to the generator 50C, and thereby to ensure a power supply, and to connect the service brake control device 110 and the assistance control device 130 to the first energy source 50A. The generator 50C and the first energy source 50A are isolated from each other in this case such that a short circuit in the generator 50C does not necessarily cause a short circuit in the first energy source 50A and vice-versa, so that both can provide energy mutually independently in a redundancy situation.

Figure 4C:
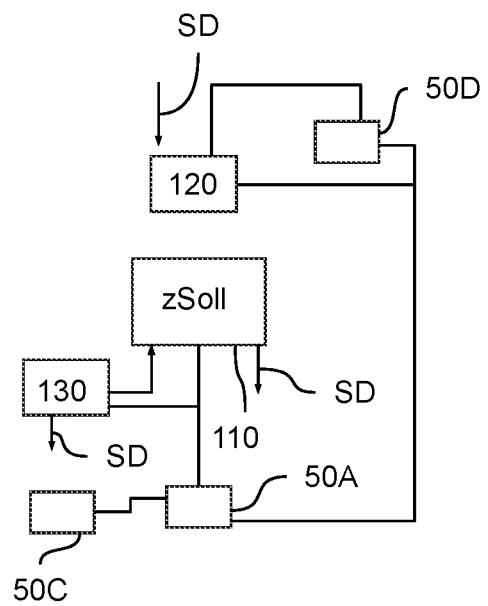

According to an embodiment represented in FIG. 4c, it is provided to use a short-term storage device 50D, for example a capacitor, in particular a power-cap, as an energy source, which is charged by the first energy source 50A during normal operation. If the first energy source 50A fails, the charged short-term storage device 50D is used as the energy source for the parking brake control device 120.

Figure 4D:
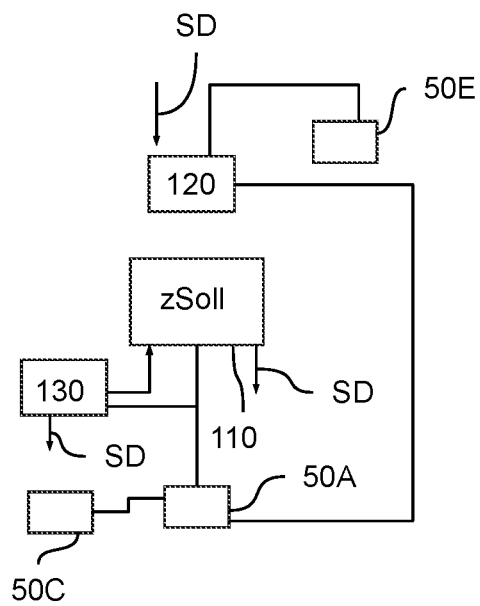

According to a further embodiment, according to FIG. 4d it is provided to use a high voltage storage device 50E as a redundant power supply, which is used in hybrid vehicles as an energy source for a drive. This is also independent of the first energy source 50A and can thus be used as a redundant energy source for the parking brake control device 120.

Alternatively, an additional redundant on-board power supply can also be installed.

Figure 5:
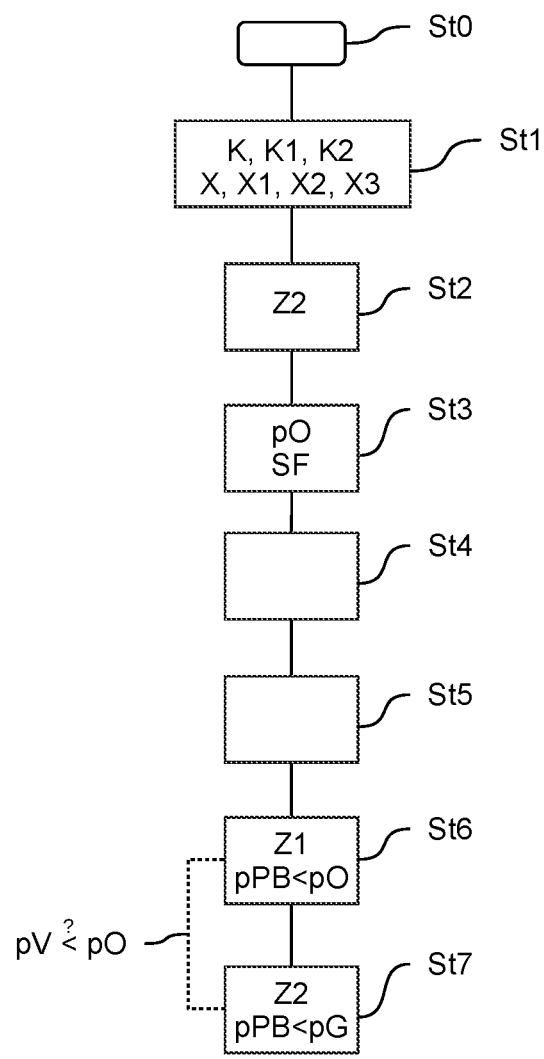
FIG. 5 shows a flow chart for carrying out a method according to an embodiment of the invention.

The actuation of the electropneumatic brake system 100 in the context of the venting function 140 can be carried out as follows according to FIG. 5 for example:

In an initial step St0 the method starts, for example with starting the vehicle 200.

In a first step St1, an arbitrary comfort function K, for example a hill-holder function K1 or a hill-starting aid K2, is activated by the parking brake control device 120 or an automatic parking brake function X1 or an auxiliary parking brake function X2 or a redundancy function X3 is specified by an assistance control device 130, i.e. braking by means of the spring-loaded cylinders 3a, 4a is automatically commended by specifying a correspondingly high electrical parking brake force fPBe. In a second step St2, the bypass valve 16 is then brought at least temporarily into the second switching position Z2, which with the bypass valve 16 in the energized state is set by means of the bypass signal SU. As a result, the control line 19 is at least temporarily vented by means of the bypass vent connection 16c and thus a lower parking brake control pressure pC is specified. As a result, the parking brake relay valve 14 specifies a correspondingly low parking brake braking pressure pPB in a third step St3 that results in closure of the spring-loaded cylinders 3a, 4a, because in that case the parking brake braking pressure pPB is lower than the opening pressure p0. As a result, the vehicle 200 is automatically held at a standstill or is brought to a standstill, wherein a variable parking brake braking pressure pPB can also be set for this by alternating switchover between the first and the second switching positions Z1, Z2 of the bypass valve 16. As a result, a cadence braking function SF is implemented, which prevents long-term wheel locking.

If in a fourth step St4 it is determined that the vehicle 200 is or is intended to be turned off or parked for the long term by means of the switch-off signal S1 or by means of activation of the immobilizer 29 by desire or by compulsion—and it is detected by means of the pressure switch 18 that at the same time there is no activation of the parking brake function by manual actuation of the parking brake valve 15 by the driver, in a fifth step St5 a further filling of the parking brake pressure medium reservoir 20C by the pressure reservoir filling device 24 is stopped because the supply of energy to the pressure reservoir filling device 24 by means of the engine 28 is discontinued in this case and thus no further pumping of pressure medium can occur. In a sixth step St6, the bypass valve 16 is then brought into the first switching position Z1 by the parking brake control device 120, so that a parking brake control pressure pC and a parking brake braking pressure pPB are built up, wherein the parking brake braking pressure pPB lies below the opening pressure p0, i.e. the spring mechanisms 3a, 4a are not opened. As a result, the reservoir pressure medium 27 from the parking brake pressure medium reservoir 20C is used.

Before the parking brake braking pressure pPB reaches the opening pressure p0 or a pressure limit pG of for example 4 bar, in a seventh step St7 the bypass valve 16 is brought into the second switching position Z2, so that the parking brake braking pressure pPB is reduced by venting via the relay valve vent connection 14a and the parking brake control pressure pC by venting into the bypass vent connection 16c. owing to the venting, pressure medium is discharged, which is thus no longer available to the brake system 100.

Steps St6 and St7 are repeated until the reservoir pressure pV in the parking brake pressure medium reservoir 20C lies at least below the opening pressure p0 of the spring-loaded cylinders 3a, 4a. As a result, in the following the vehicle 200 is held at a standstill even when the parking brake valve 15a is not manually activated, because the reservoir pressure pV in the parking brake pressure medium reservoir 20C is not sufficient to change the spring-loaded cylinders 3a, 4a over to the open or released actuation position. As a result, when the vehicle 200 is turned off the bypass valve 16 does not have to be held in the second, energized switching position Z2 thereof and can rather change over into the first, stable switching position Z1.

Steps St1 through St4 can also be omitted, wherein the venting function 140 is then only carried out by means of steps St5 through St7. This is advantageous if it has been determined that the driver wishes to stop or park the vehicle 200 without manual actuation of the parking brake valve 15. Also, in that case steps St6 and St7 are carried out until the reservoir pressure pV has fallen at least below the opening pressure p0.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST 1, 2, 3, 4 wheel brakes
3a, 4a spring-loaded cylinders
3b, 4b service brake cylinders
5, 6, 7, 8 wheels
9 first axle modulator on the front axle VA
10 second axle modulator on the rear axle VB
11 foot brake valve
14 parking brake relay valve
14a relay valve vent connection
14b pneumatic control input
14c pneumatic brake pressure output
15 parking brake valve
15a parking brake vent connection
16 bypass valve
16a, 16b input port
16c bypass vent connection
16d output port
17 connecting line
18 pressure sensor/pressure switch
19 control line
20A first pressure medium reservoir for the first service brake braking circuit A
20B second pressure medium reservoir for the second service brake braking circuit B
20C parking brake pressure medium reservoir
21 trailer control valve
22 safety valve
23 filling line
24 pressure medium reservoir filling device
25 engine control device
26 warning device
27 reservoir pressure medium
28 engine
29 immobilizer
50A first energy source
50B second energy source
50C generator
50D short-term storage device
50E high voltage storage device
100 electropneumatic brake system
105 parking brake
110 service brake control device (ECU)
120 parking brake control device
130 assistance control device (ADAS-ECU)
140 venting function
150 safety function
200 vehicle
A, B service brake braking circuits
C parking brake braking circuit
F actuation
fPBe electrical parking brake force
fPBm manual parking brake force
HA rear axle
K comfort function
K1 hill-holder function
K2 hill-starting aid
pA, pB service brake control pressure
pAtm atmospheric pressure
pC parking brake control pressure
pE venting pressure
pG pressure limit
p0 opening pressure
pPB parking brake braking pressure
pV reservoir pressure
p1, p2, p3, p4 service brake braking pressure
p14 relay valve pressure
p15 actuating pressure
p16 bypass control pressure
SA, SB control signals
SF cadence braking function
SPB parking brake signal
SS safety signal
SU bypass signal
S1 switch-off signal
VA front axle
X1 parking brake function
X2 auxiliary parking brake function
X3 redundancy function
zSoll setpoint vehicle deceleration
Z1 first switching position
Z2 second switching position
St1, St2, St3, St4, St5, St6, St7 steps of the method

The invention claimed is:

1. An electronically controllable pneumatic brake system in a vehicle, the brake system comprising:
   wheel brakes for braking respective wheels of the vehicle, wherein wheel brakes of at least one vehicle axle include spring-loaded cylinders for implementing a pneumatic parking brake in a parking brake braking circuit of the vehicle,
   an electronically controllable monostable bypass valve, wherein the monostable bypass valve is disposed between a manually operated parking brake valve and the spring-loaded cylinders such that the monostable bypass valve:
   controls, in a first switching position, a bypass control pressure based on an actuation pressure produced by the parking brake valve to implement a manually specified parking brake force, wherein a maximum actuation pressure corresponds to a reservoir pressure of a reservoir pressure medium in a parking brake pressure medium reservoir supplying the parking brake braking circuit, and
   controls, in a second switching position, a bypass control pressure depending on a venting pressure prevailing in a bypass vent connection to implement an electrically specified parking brake force,
   wherein a parking brake braking pressure controlled at the spring-loaded cylinder can be set depending on the respective bypass control pressure, and
   wherein the monostable bypass valve automatically changes over to the first switching position without electrical actuation.

2. The electronically controllable pneumatic brake system as claimed in claim 1, further comprising, between the manually actuatable parking brake valve and the spring-loaded cylinders, a parking brake relay valve configured to produce an air volume-boosted relay valve pressure based on a parking brake control pressure such that the monostable bypass valve:
   controls, in the first switching position, the actuating pressure produced by the parking brake valve as the bypass control pressure and passes the same as the parking brake control pressure to a pneumatic control input of the parking brake relay valve, or controls the air volume-boosted relay valve pressure produced because of the actuation pressure by the parking brake relay valve as the bypass control pressure and passes the same as the parking brake braking pressure to the spring-loaded cylinders to implement the manually specified parking brake force, and
   controls, in a second switching position, the venting pressure prevailing in the bypass vent connection as the bypass control pressure and passes the same as the parking brake control pressure to the pneumatic control input of the parking brake relay valve to implement the electrically specified parking brake force.

3. The electronically controllable pneumatic brake system as claimed in claim 2, wherein the monostable bypass valve is disposed between the parking brake valve and the pneumatic control input of the parking brake relay valve to output the actuation pressure as the parking brake control pressure in the first switching position and the venting pressure as the parking brake control pressure in the second switching position.

4. The electronically controllable pneumatic brake system, as claimed in claim 2, wherein the monostable bypass valve is disposed between a pneumatic brake pressure output of the parking brake relay valve and the spring-loaded cylinders to output the relay valve pressure as the parking brake braking pressure in the first switching position and the venting pressure as the parking brake braking pressure in the second switching position.

5. The electronically controllable pneumatic brake system as claimed in claim 1, wherein on detecting a long-term switch-off of the vehicle and an unactuated parking brake valve, a venting function can be carried out, wherein the parking brake pressure medium reservoir can be emptied by the venting function to hold the vehicle at a standstill for the long term, even without electrical actuation of the monostable bypass valve.

6. The electronically controllable pneumatic brake system as claimed in claim 5, wherein the venting function can prevent the provision of reservoir pressure medium for the parking brake braking circuit with a reservoir pressure of greater than or equal to an opening pressure of the spring-loaded cylinders to apply the spring-loaded cylinders with the monostable bypass valve in the first switching position.

7. The electronically controllable pneumatic brake system as claimed in claim 5, wherein a pressure medium reservoir filling device interacts with an engine of the vehicle such that filling the parking brake pressure medium reservoir is prevented once the engine is turned off, wherein at the same time the first and second switching positions of the monostable bypass valve can be set alternately with the engine turned off to reduce the reservoir pressure in the parking brake pressure medium reservoir by building up a parking brake braking pressure from the parking brake pressure medium reservoir in the first switching position and venting the parking brake braking circuit in the second switching position.

8. The electronically controllable pneumatic brake system, as claimed in claim 7, wherein turning off the engine by means of a switch-off signal or by activation of an immobilizer can be detected.

9. The electronically controllable pneumatic brake system as claimed claim 1, wherein the monostable bypass valve can be actuated electrically by means of a bypass signal specified by a parking brake control device,
   wherein the monostable bypass valve changes into the first, de-energized switching position when there is no actuation by means of the bypass signal and changes into the second, energized switching position in the event of actuation by means of the bypass signal.

10. The electronically controllable pneumatic brake system as claimed in claim 9, wherein the parking brake control device is embodied to specify the bypass signal such that the monostable bypass valve can be alternately changed over between the first switching position and the second switching position to implement graduated braking and to implement a cadence braking function by varying the parking brake braking pressure.

11. The electronically controllable pneumatic brake system as claimed in claim 10, wherein the bypass signal can be specified by pulse width modulation.

12. The electronically controllable pneumatic brake system as claimed in claim 9, wherein the bypass signal can be specified by the parking brake control device depending on a comfort function, for example a hill-holder function or a hill-starting aid, or depending on an automatic parking brake function or an auxiliary parking brake function or a redundancy function specified by an assistance control device.

13. The electronically controllable pneumatic brake system as claimed in claim 12, wherein the redundancy function can be activated in the event of a failure or a defect during the electronic actuation of the axle modulators, wherein as a result the monostable bypass valve can be electrically actuated by means of the bypass signal specified by the parking brake control device for redundant electropneumatic braking of the vehicle by means of the pneumatic parking brake.

14. The electronically controllable pneumatic brake system as claimed in claim 9, wherein the actuating pressure controlled by means of the parking brake valve can be produced depending on a manual parking brake force (fPBm) specified by manual actuation of the parking brake valve without actuation by the bypass signal.

15. The electronically controllable pneumatic brake system as claimed in claim 1, wherein a safety valve is disposed between the monostable bypass valve and the bypass vent connection to implement a safety function, by which the specification of the venting pressure as the bypass control pressure can be prevented in the event of inadvertent setting of the second switching position of the monostable bypass valve.

16. A vehicle, with an electronically controlled pneumatic brake system as claimed in claim 1.

17. A method for electronically controlling a pneumatic brake system of a vehicle, the method comprising:
determining whether a long-term switch-off of the vehicle is carried out and whether a parking brake valve is unactuated,
activating a venting function if the vehicle is turned off for the long term when the parking brake valve is not actuated;
wherein the venting function causes the parking brake pressure medium reservoir to be emptied so that the reservoir pressure medium from the parking brake pressure medium reservoir is delivered into the parking brake braking circuit at a reservoir pressure that is lower than an opening pressure of the spring-loaded cylinders, so that the spring-loaded cylinders remain applied with the monostable bypass valve in the first switching position.

18. The method as claimed in claim 17, wherein by turning off the engine, filling the parking brake pressure medium reservoir by the pressure medium reservoir filling device is prevented if the venting function is activated, so that in the event of subsequent setting of the first switching position of the bypass valve the reservoir pressure is reduced owing to a rising parking brake control pressure and a rising parking brake braking pressure and in the event of a subsequent setting of the second switching position of the bypass valve the parking brake braking circuit is ventilated.

19. The method as claimed in claim 18, wherein a switchover of the bypass valve into the second switching position is carried out before the parking brake braking pressure equals the opening pressure.

20. The method as claimed in claim 18, wherein the bypass valve is changed over between the first and second switching positions multiple times until the reservoir pressure has fallen below the pressure limit or the opening pressure.

* * * * *